May 22, 1962     M. L. BENJAMIN     3,035,845
COLLET CHUCK
Filed Nov. 27, 1959
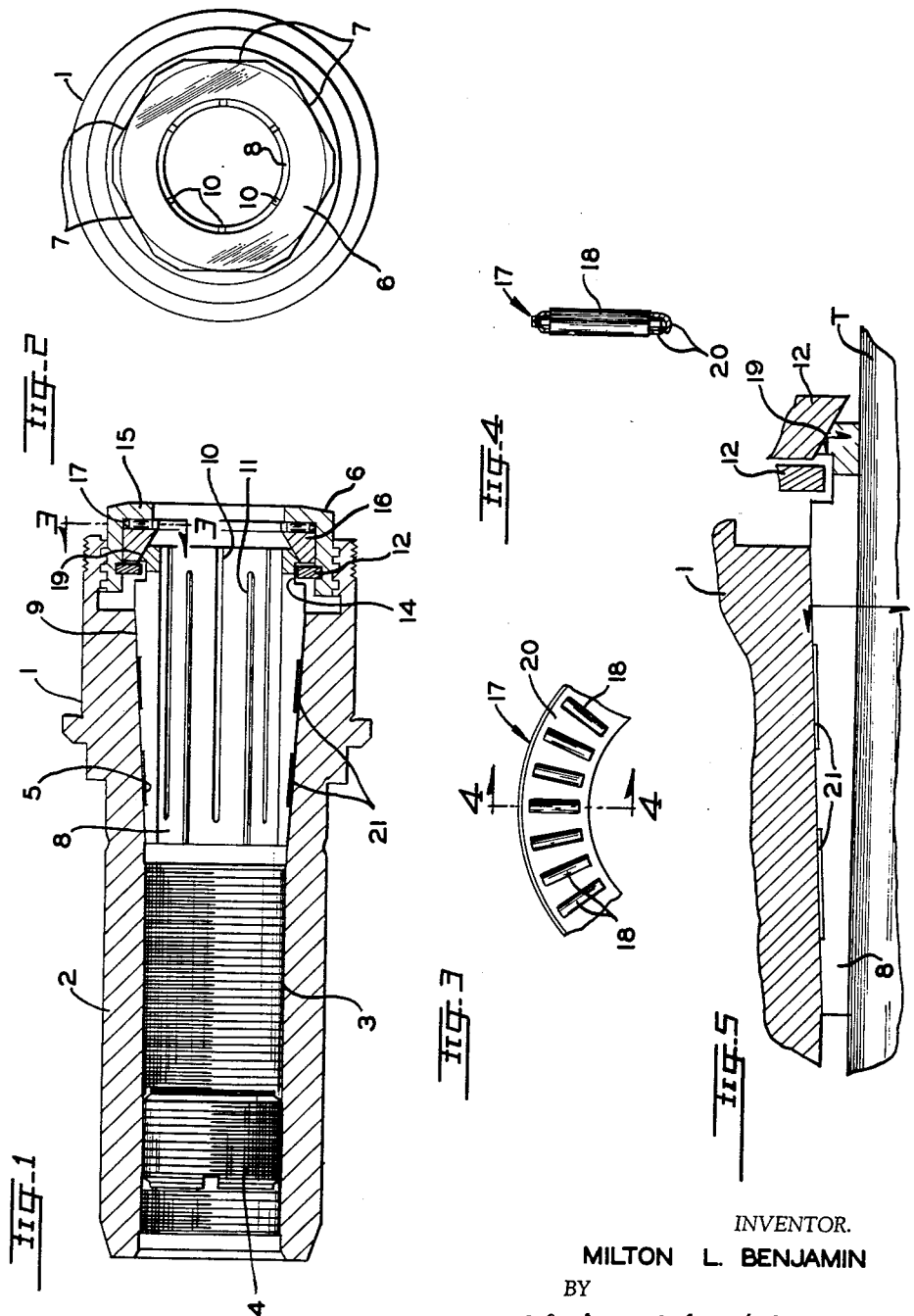
INVENTOR.
MILTON L. BENJAMIN
BY
Oberlin, Maky & Donnelly
ATTORNEYS United States Patent Office 3,035,845
Patented May 22, 1962

3,035,845
COLLET CHUCK
Milton L. Benjamin, Shaker Heights, Ohio, assignor to Erickson Tool Company, Solon, Ohio, a corporation of Ohio
Filed Nov. 27, 1959, Ser. No. 855,764
7 Claims. (Cl. 279—47)

The present invention relates generally as indicated to a collet chuck in which a drill, reamer, tap or like tool, or a workpiece, is gripped by a contractible collet.

In chucks of this type the collet is received in a chuck body or shank formed with a tapered bore and the collet is formed with an external surface of corresponding taper so that when the collet is forced longitudinally inwardly of the shank, it will be radially contracted into gripping engagement with the tool or workpiece positioned within the collet. When the chuck is employed for heavy-duty work, it is desirable that the angle of the taper in question be as little as possible, e.g. 8 to 10° included angle or less, in order to increase the wedge action between the collet and shank so as to provide correspondingly increased gripping action. However, unless the angle be considerably greater than just indicated, for example, exceeds 15° or 20° included angle, the collet is not self-releasing i.e. it will remain wedged in the shank even though the endwise pressure thereon be removed.

One principal object of the present invention accordingly is to provide means whereby in a chuck of the type in which the coacting tapered faces are thus of small angularity, the collet may be positively and easily forced out of the bore of the shank in order to release the tool or workpiece held within the collet.

A further object is to provide means as aforesaid, which may be readily incorporated in the chuck structure without substantially adding to the length and diameter thereof.

Yet another object is to provide means for the purpose in question which is of very simple and inexpensive form and which greatly facilitates the replacement of the collet with another one of different size.

Yet another object is to provide a chuck of the character indicated in which the endwise collet contracting pressure is obtained through a screw-threaded connection of a nose piece assembly with the shank, said assembly embodying antifriction bearing means so as to prevent transmission of twisting strains on the collet when thus urged endwise into the shank.

Still another object is to provide a chuck of the character indicated in which the aforesaid nose piece assembly is formed so that when turned in a direction to apply endwise withdrawing force on the collet, it does so with increased friction with the collet so as to tend to turn the latter while at the same time axially withdrawing it from the shank. This tendency to turn the collet facilitates the withdrawal of the collet even though it may have been tightly wedged in the shank.

Still another object is to provide a nose-piece assembly as aforesaid in which there is a self-aligning nose ring engageable with the collet to apply endwise contracting force on the latter and in which the antifriction bearing in said assembly comprises radially disposed needles or rollers directly engaged between parallel plane faces of the nose ring and the nose-piece.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

FIG. 1 is a central longitudinal section view of a chuck embodying the present inprovements;

FIG. 2 is an end elevation view as viewed from the right-hand end of FIG. 1;

FIG. 3 is a fragmentary elevation view of the antifriction axial thrust bearing which is disposed between the nose piece and the nose ring of the chuck in order to prevent transmission of twisting forces to the collet as it is wedged into the shank to grip a tool or workpiece;

FIG. 4 is a radial cross-section view of the thrust bearing on enlarged scale as taken substantially along the line 4—4, FIG. 3; and, FIG. 5 is a fragmentary cross-section view showing the distribution of forces on the collet when in wedged tool or workpiece gripping position.

The main elements of the chuck as illustrated in FIGS. 1 and 2 of the drawing are those familiarly found in chucks of the type in question. Thus, the chuck body 1 (ordinarily referred to as the shank) has an elongated stem or shank portion 2 adapted to be mounted in the spindle or turret of a metal working machine. The shank portion 2 has internal threads 3 for an adjustable stop screw 4 against which the end of a tool or workpiece is adapted to be positioned. The front end of the shank 1 is formed with a tapered bore 5 which preferably is of 4 to 5° taper with respect to the axis of the shank 1, that is, 8° to 10° included angle. The shank bore 5 is enlarged adjacent its large end and is internally threaded to receive the externally threaded nose piece 6, said nose piece being formed with wrench engaging portions 7 axially beyond the front end of the shank 1 by which said nose piece may be turned in opposite directions.

The collet 8 which is mounted for axial movement with respect to the shank 1 is formed exteriorly with a complementary frusto-conical surface 9 which is designed to coact with the wall of tapered bore 5 of the shank 1. The collet 8, as usual in chucks of this type, is longitudinally intersected by slots 10 and 11 which extend as shown alternately from opposite ends thereof almost to the other end so that when the collet 8 is forced axially inwardly it will be radially contracted and thus caused to grip a tool inserted therewithin, or similarly, to grip a workpiece, if desired. It will be understood that the collet 8 will be made of tempered steel or equivalent resiliently deformable metal, so that upon contracting pressure being released, it will expand radially to its original unstressed diameter. However, as previously explained, when the angle of the coacting wedge faces 5 and 9 is less than about 15°–20° included angle, the friction of the interengaged faces is sufficiently great to prevent movement of the collet 8 axially outwardly of the shank 1 by its inherent expansive force.

Accordingly, the nose piece 6 herein is formed with an undercut in which is disposed a one-piece split snap ring 12 which extends radially inwardly into the peripheral groove 14 formed adjacent the front end of the collet 8, whereby when the nose piece 6 is turned in a direction to unscrew the same from the shank 1, the snap ring 12 will engage the rearwardly facing side of groove 14 and forcefully axially withdraw the collet 8 from the shank 1 to thereby release the grip on the tool or workpiece. The nose piece 6 is formed with a radially inwardly extending flange 15 and interposed between the snap ring 12 and said flange 15 is a nose ring 16 and, in addition, there is an antifriction bearing 17, preferably a needle or roller bearing, in which the cylindrical bearing elements 18 extend radially as best shown in FIG. 3 and are in direct engagement between the parallel plane faces of flange 15 and nose ring 16.

The front end of the collet 8 is beveled as at 19, the taper being reverse to that of surface 9 and at a much steeper angle, such as about 60° included angle, and the nose ring 16 is formed with a correspondingly tapered bore to engage the tapered or beveled front end of the collet 8. The nose ring 16 preferably has a slight radial clearance in the nose piece 6 whereby the former floats in the latter and thus prevents transmission of lateral forces on the collet 8 due to, for example, eccentricity of the shank and nose piece threads.

With reference to the antifriction bearing 17, it is preferred to use a needle or roller bearing of the type aforesaid, rather than a ball bearing which would require very hard races in order to prevent "brinelling" or indenting thereof by the balls which have only point contacts with the races. Herein, the cylindrical needles or rollers 18, each has line contact with the respective plane faces of the flange 15 and nose ring 16 and thus has an infinitely greater contact area than would a ball of corresponding diameter. The bearing 17 herein comprises the rollers 18 and a pair of retainer plates 20 each formed with a series of rectangular openings axially beyond which the peripheries of the rollers 18 extend so as to engage the nose ring 16 and the inturned flange 15 of the nose piece 6.

It is to be noted that as a further feature of the collet 8 it is formed with peripheral grooves 21, whereby the external surface 9 of the collet contacts the tapered bore 5 of the shank at a plurality of axially spaced zones. By reason of the provision of the long taper 9 of collet 8 (2 to 2½ times the diameter of the collet bore), the floating nose ring 16 which engages the front beveled end of the collet 8, and the antifriction bearing 17 between the nose piece flange 15 and the nose ring 16 firm and coaxial gripping of a tool or workpiece is assured, it having been found that the grip strength is 100% (or more) greater than obtainable with known chucks. Except for loss due to friction of the threads of the shank 1 and nose piece 6 and of the coacting faces 5 and 9 the gripping strength of the collet is the product of the mechanical advantages of the threads and of the wedge taper. Moreover, it has been discovered that when the coacting faces 5 and 9 have an 8° included angle taper, the grip obtainable thereby is as good as obtained with a smaller included angle taper of say 4 or 6°, but the axial travel required herein is substantially less. With a smaller taper such as 4° to 6°, as aforesaid, the point is reached where the application of a very great torque on the nose piece 6 will not result in further axial advance of the collet 8 into the shank 1 due to the high friction of the collet 8 within the tapered bore 5 of the shank 1.

In using the present chuck, the shank 1 of the tool T (or a workpiece, if desired) is inserted through the collet bore as in FIG. 5 into abutting engagement with the adjustable stop screw 4, whereupon the nose piece 6 is turned in to force the collet 8 axially inwardly of the shank 1. Such axial advance of the collet 8 effects radial contraction thereof into firm gripping engagement with the tool T with a decided mechanical advantage of say 12:1 due to the threads times 14:1 (less friction) due to the small taper of 8° included angle, for example, of the coacting faces 5 and 9 of the shank 1 and collet 8. The beveled outer end 19 of the collet 8 coacting with the flared bore of the nose ring 16 effects radial contraction of that region of the collet 8 which is axially beyond and unsupported by the shank bore 5. Axial force exerted on the beveled end 19 causes axial travel of the collet 8 into the shank 1 and such force has a radial component which presses the outer end of the collet 8 into engagement with the tool T. By reason of the provision of the antifriction bearing 17 preferably the needle or roller bearing herein shown, of which the cylindrical elements 18 are engaged directly between the nose piece flange 15 and the nose ring 16 without necessity of providing separate hardened races as required with ball bearings, the tendency of turning of the nose ring 16 as the nose piece 6 is screwed in is almost entirely eliminated. Accordingly, no perceptible twisting strains are imposed on the collet 8 whereby it will be uniformly contracted into gripping engagement with the tool T while the tool T is held in accurate, coaxial alignment with the shank 1.

Now, when it is desired to release the chuck for removal of the tool T, all that the operator has to do is to turn the nose piece 6 in the opposite direction whereby the snap ring 12 engages the end face of the groove 14 of the collet and exerts a positive axial withdrawing force on the collet. It is to be noted that because of the friction between the snap ring 12 and the collet, the latter is turned at the same time that it is being positively axially withdrawn. This turning tendency on the collet greatly facilitates the easy withdrawal of the contracted collet to a position where its own resilience will cause it to release its grip on the tool T. This action of the snap ring 12 on the collet 8 may be likened to the ease of withdrawal of a cork from the mouth of a bottle when it is at the same time twisted and pulled.

Reference may be had to FIG. 5, showing the distribution of the forces when the collet 8 herein is contracted into gripping engagement with a tool T.

Another noteworthy feature of this invention is the simplicity thereof and the ease with which the collet 8 may be interchanged for another of a different size. In order to remove the collet 8 from the nose piece assembly, all that has to be done is to wrap the fingers around the collet at a region adjacent the nose piece 6 and to squeeze the collet until the rearwardly facing side of the groove 14 is of smaller diameter than the inside diameter of the snap ring 12, whereupon the collet 8 may be pulled out of the nose piece assembly. Similarly, when installing a new collet 8 it is merely shoved axially into the nose piece assembly, the beveled end face 19 serving as a cam to contract that end of the collet whereupon it snaps outwardly when the groove 14 is in register with the snap ring 12 and is retained thereby in the position shown in FIG. 1. The snap ring 12, in addition to serving as the collet withdrawing element of the nose piece 6, serves as a retainer to hold the collet 8, nose ring 16, and bearing 17 together as a unitary assembly, whereby there are only two pieces to handle, namely, the shank 1 and the nose piece and collet assembly comprising the collet 8, the nose ring 16, the snap ring 12, the bearing 17, and the nose piece 6.

Other modes of applying the principle of the invention may be employed, change being made as regards the details described, provided the features stated in any of the following claims, or the equivalent of such, be employed.

I therefore particularly point out and distinctly claim as my invention:

1. In a chuck, the combination of a shank; a contractible collet reciprocably mounted therein; said shank and collet being formed with coacting faces whereby the latter is contracted upon movement axially inwardly of the former; and an annular nose piece assembly axially reciprocably connected to said shank; said assembly comprising a nose piece having threaded engagement with said shank and being formed with axially spaced apart radially inwardly extending flanges, and a nose ring and an antifriction thrust bearing interposed between said flanges whereby said nose ring and bearing are axially retained in said nose piece, said nose ring being engageable with the axially outer end portion of said collet whereby, upon turning of said nose piece in one direction, said collet is forced axially into said shank by axial force applied through one flange of said nose piece, said bearing, and said nose ring, said collet being formed with an axially inwardly facing shoulder adjacent its axially outer end, the other flange of said nose piece extending radially inwardly of said shoulder at a region axially inwardly thereof to present annularly radially overlapped faces on said nose piece and collet whereby, upon turning of said nose piece in the opposite direction, said collet is pulled axially outwardly of said shank and turned by frictional engagement of said overlapped faces of said other flange with said shoulder.

2. The chuck of claim 1, wherein said other flange comprises a snap ring firmly engaged in an internal groove formed in said nose piece for turning with the latter as it is turned in such opposite direction.

3. The chuck of claim 1 wherein said antifriction bearing includes a plurality of radially extending cylindrical rollers having direct rolling engagement with the plane axially outer end of said nose ring and the plane axially inner face of said one flange when said nose piece is turned in such one direction whereby substantially no turning torque is imposed on said collet.

4. The chuck of claim 1 wherein the external face of said collet which coacts with said shank is formed with a plurality of peripheral grooves to provide a series of axially spaced face portions that coact with said shank as aforesaid.

5. The chuck of claim 1 wherein the coacting faces of said shank and collet are frusto-conical with an included angle of taper of from about 8 to 10° to render said collet self-locking in said shank and to secure a substantial mechanical advantage for securely gripping a tool or workpiece adapted to be positioned within said collet.

6. The chuck of claim 1 wherein the axially outer end portion of said collet is formed to be readily contracted to an extent such that said shoulder is of smaller diameter than the inside diameter of said other flange whereby said collet may be axially removed from said nose piece for replacement.

7. The chuck of claim 6 wherein the axially outer end portion of said collet is beveled for engagement with said other flange to facilitate assembly of said collet in said nose piece by shoving said collet axially into said nose piece until said shoulder snaps out when disposed between said flanges.

References Cited in the file of this patent

UNITED STATES PATENTS

| | | |
|---|---|---|
| 2,346,706 | Stoner | Apr. 18, 1944 |
| 2,465,837 | Benjamin | Mar. 29, 1949 |
| 2,469,014 | Stalhandske | May 3, 1949 |
| 2,885,210 | Sima | May 5, 1959 |